(12) United States Patent
Coon et al.

(10) Patent No.: US 7,836,276 B2
(45) Date of Patent: Nov. 16, 2010

(54) SYSTEM AND METHOD FOR PROCESSING THREAD GROUPS IN A SIMD ARCHITECTURE

(75) Inventors: Brett W. Coon, San Jose, CA (US); John Erik Lindholm, Saratoga, CA (US)

(73) Assignee: NVIDIA Corporation, Santa Clara, CA (US)

(*) Notice: Subject to any disclaimer, the term of this patent is extended or adjusted under 35 U.S.C. 154(b) by 11 days.

(21) Appl. No.: 11/292,614

(22) Filed: Dec. 2, 2005

(65) Prior Publication Data
US 2007/0130447 A1 Jun. 7, 2007

(51) Int. Cl.
*G06F 9/30* (2006.01)
*G06F 9/38* (2006.01)

(52) U.S. Cl. .................... 712/206; 712/10; 712/11
(58) Field of Classification Search ............ 711/207; 712/10, 11, 24, 206, 218
See application file for complete search history.

(56) References Cited

U.S. PATENT DOCUMENTS

| | | | |
|---|---|---|---|
| 5,421,028 A | 5/1995 | Swanson | |
| 5,579,473 A | 11/1996 | Schlapp et al. | |
| 5,815,166 A | 9/1998 | Baldwin | |
| 5,838,988 A * | 11/1998 | Panwar et al. | 712/32 |
| 5,860,018 A * | 1/1999 | Panwar | 712/23 |
| 5,890,008 A * | 3/1999 | Panwar et al. | 712/15 |
| 5,948,106 A * | 9/1999 | Hetherington et al. | 713/501 |
| 5,958,047 A * | 9/1999 | Panwar et al. | 712/237 |
| 5,978,864 A * | 11/1999 | Hetherington et al. | 710/18 |
| 5,996,060 A | 11/1999 | Mendelson et al. | |
| 5,999,727 A * | 12/1999 | Panwar et al. | 712/225 |
| 6,178,481 B1 | 1/2001 | Krueger et al. | |
| 6,204,856 B1 | 3/2001 | Wood et al. | |
| 6,222,550 B1 | 4/2001 | Rosman et al. | |
| 6,266,733 B1 | 7/2001 | Knittel et al. | |
| 6,279,086 B1 | 8/2001 | Arimilli et al. | |
| 6,279,100 B1 * | 8/2001 | Tremblay et al. | 712/24 |
| 6,288,730 B1 | 9/2001 | Duluk et al. | |
| 6,397,300 B1 | 5/2002 | Arimilli et al. | |
| 6,405,285 B1 | 6/2002 | Arimilli et al. | |

(Continued)

FOREIGN PATENT DOCUMENTS

JP 2003-35589 5/2003

OTHER PUBLICATIONS

Hinton et al, The Microarchitecture of the Pentium 4 Processor, Intel Technology Journal Q1, 2001, p. 1-12.*

(Continued)

*Primary Examiner*—Aimee J Li
(74) *Attorney, Agent, or Firm*—Patterson & Sheridan, LLP

(57) ABSTRACT

A SIMD processor efficiently utilizes its hardware resources to achieve higher data processing throughput. The effective width of a SIMD processor is extended by clocking the instruction processing side of the SIMD processor at a fraction of the rate of the data processing side and by providing multiple execution pipelines, each with multiple data paths. As a result, higher data processing throughput is achieved while an instruction is fetched and issued once per clock. This configuration also allows a large group of threads to be clustered and executed together through the SIMD processor so that greater memory efficiency can be achieved for certain types of operations like texture memory accesses performed in connection with graphics processing.

19 Claims, 6 Drawing Sheets

U.S. PATENT DOCUMENTS

| | | | | |
|---|---|---|---|---|
| 6,418,513 | B1 | 7/2002 | Arimilli et al. | |
| 6,434,667 | B1 | 8/2002 | Arimilli et al. | |
| 6,446,166 | B1 | 9/2002 | Arimilli et al. | |
| 6,463,507 | B1 | 10/2002 | Arimilli et al. | |
| 6,559,852 | B1 | 5/2003 | Ashburn et al. | |
| 6,658,447 | B2* | 12/2003 | Cota-Robles | 718/103 |
| 6,704,925 | B1 | 3/2004 | Bugnion | |
| 6,750,869 | B1 | 6/2004 | Dawson | |
| 6,771,264 | B1 | 8/2004 | Duluk et al. | |
| 6,816,161 | B2 | 11/2004 | Lavelle et al. | |
| 6,819,325 | B2 | 11/2004 | Boyd et al. | |
| 6,947,047 | B1* | 9/2005 | Moy et al. | 345/501 |
| 7,015,718 | B2* | 3/2006 | Burky et al. | 326/40 |
| 7,103,720 | B1 | 9/2006 | Moy et al. | |
| 7,139,003 | B1 | 11/2006 | Kirk et al. | |
| 7,185,181 | B2* | 2/2007 | Parthasarathy | 712/218 |
| 7,237,094 | B2* | 6/2007 | Curran et al. | 712/213 |
| 7,254,697 | B2* | 8/2007 | Bishop et al. | 712/213 |
| 7,278,011 | B2* | 10/2007 | Eisen et al. | 712/218 |
| 7,328,438 | B2 | 2/2008 | Armstrong et al. | 718/100 |
| 7,447,873 | B1* | 11/2008 | Nordquist | 712/22 |
| 2001/0056456 | A1* | 12/2001 | Cota-Robles | 709/103 |
| 2003/0097395 | A1* | 5/2003 | Petersen | 709/102 |
| 2004/0194096 | A1* | 9/2004 | Armstrong et al. | 718/100 |
| 2004/0207623 | A1 | 10/2004 | Isard et al. | |
| 2004/0208066 | A1* | 10/2004 | Burky et al. | 365/200 |
| 2005/0108720 | A1* | 5/2005 | Cervini | 718/105 |
| 2005/0122330 | A1 | 6/2005 | Boyd et al. | |
| 2006/0020772 | A1 | 1/2006 | Hussain | |
| 2006/0155966 | A1* | 7/2006 | Burky et al. | 712/218 |

OTHER PUBLICATIONS

Intel, IA-32 Architecture Software Developer's Manual, vol. 2B, p. 4-72.*

Intel, IA-32 Intel Architecture Software Developer's Manual, vol. 1, pp. 11-23 through 11-25.*

Lo, Jack L.; Eggers, Susan J.; Emer, Joel S.; Levy, Jenry M.; Stamm, Rebecca L.; and Tullsen, Dean M., "Converting Thread-Level Parallelism to Instruction-Level Parallelism via Simultaneous Multithreading", ACM Transactions on Computer Systems, vol. 15, No. 3, Aug. 1997. pp. 322-354.*

Tullsen, Dean M.; Eggers, Susan J.; Emer, Joel S.; Levy, Henry M.; Lo, Jack L.; and Stamm, Rebecca L., "Exploiting Choice: Instruction Fetch and Issue on an Implementable Simultaneous Multithreading Processor", Proceedings of the 23$^{rd}$ Annual International Symposium on Computer Architectur, May 1996. pp. 1-12.*

Eggers, et al. "Simultaneous Multithreading: A Platform for Next-Generation Processors," *IEEE Micro*, vol. 17, No. 5, pp. 12-19, Sep./Oct. 1997.

English abstract of JP 2003-35589 with additional translated information.

Translated Japanese Office Action dated Jun. 9, 2008 (provided as an explanation of relevance of Citation No. B1).

Sen et al., "Shadow Silhouette Maps" Jul. 2003, ACM Transactions on Graphics 22, 3, pp. 521-526.

Office Action, U.S. Appl. No. 11/458,633, mailed Oct. 1, 2009.

* cited by examiner

SYSTEM AND METHOD FOR PROCESSING THREAD GROUPS IN A SIMD ARCHITECTURE

BACKGROUND OF THE INVENTION

1. Field of the Invention

Embodiments of the present invention relate generally to single-instruction, multiple-data (SIMD) processing and, more particularly, to a system and method for processing thread groups in a SIMD processor.

2. Description of the Related Art

A SIMD processor associates a single instruction with multiple data paths to allow the hardware to efficiently execute data-parallel algorithms. The usual benefits of a SIMD processor implementation results from the reduction in pipeline control hardware and instruction processing that comes from running multiple data paths in lockstep.

In general, increasing the number of data paths in a SIMD processor will allow more data to be processed in parallel and will lead to performance improvements. Processor size constraints, however, limit the number of data paths beyond a certain number. Also, if the number of data paths is too large, there may be under-utilization of hardware resources.

SUMMARY OF THE INVENTION

The present invention provides a processor with an improved SIMD architecture that efficiently utilizes its hardware resources to achieve higher data processing throughput. According to an embodiment of the present invention, the effective width of a SIMD processing unit is extended to a multiple of the actual hardware width by clocking the instruction processing side of the SIMD processing unit at a fraction of the rate of the data processing side. According to another embodiment of the present invention, the effective width of a SIMD processing unit is extended by providing multiple execution pipelines. By using different clock rates and providing multiple execution pipelines, a large amount of threads can be grouped together into a convoy of threads according to the formula: convoy_size=(number of execution pipelines)×(number of data paths in each execution pipeline)×(ratio of the clock rate of the data processing side to the clock rate of the instruction processing side).

A SIMD processing unit according to an embodiment of the present invention includes an instruction processing section that operates at a first clock rate and a data processing section that operates at a second clock rate that is different from the first clock rate. Preferably, the second clock rate is at least twice the first clock rate. The instruction processing section issues an instruction to be executed in the data processing section and collects operands to be used in executing the issued instruction. Multiple sets of such operands are collected.

The data processing section includes at least first and second execution pipelines. The first execution pipeline is configured to execute instructions of a first type, e.g., multiply and add (MAD), and the second execution pipeline is configured to execute instructions of a second type, e.g., special function instructions such as reciprocal, exponential, logarithmic, etc. (SFU). Each execution pipeline has multiple data paths that are identically configured in accordance with the issued instruction.

Each set of operands collected in the instruction processing section is supplied to one of the data paths. A set of operands associated with an MAD instruction is supplied to one of the data paths in the first execution pipeline. A set of operands associated with an SFU instruction is supplied to one of the data paths in the second execution pipeline.

The number of sets of operands collected for an issued instruction is preferably equal to the number of actual data paths in the first and second execution pipelines multiplied by the ratio of the second clock rate to the first clock rate. For example, when the ratio of the second clock rate to the first clock rate is 2, the number of sets of operands collected for an issued instruction should be 2×(number of data paths in the first and second execution pipelines).

According to embodiments of the present invention, a new instruction need not be issued at every cycle of the data processing rate to keep the data processing section fully utilized. This allows the instruction processing section to operate at a reduced clock rate that is more suitable for instruction processing and as a result reduces the hardware requirements for the instruction processing section.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
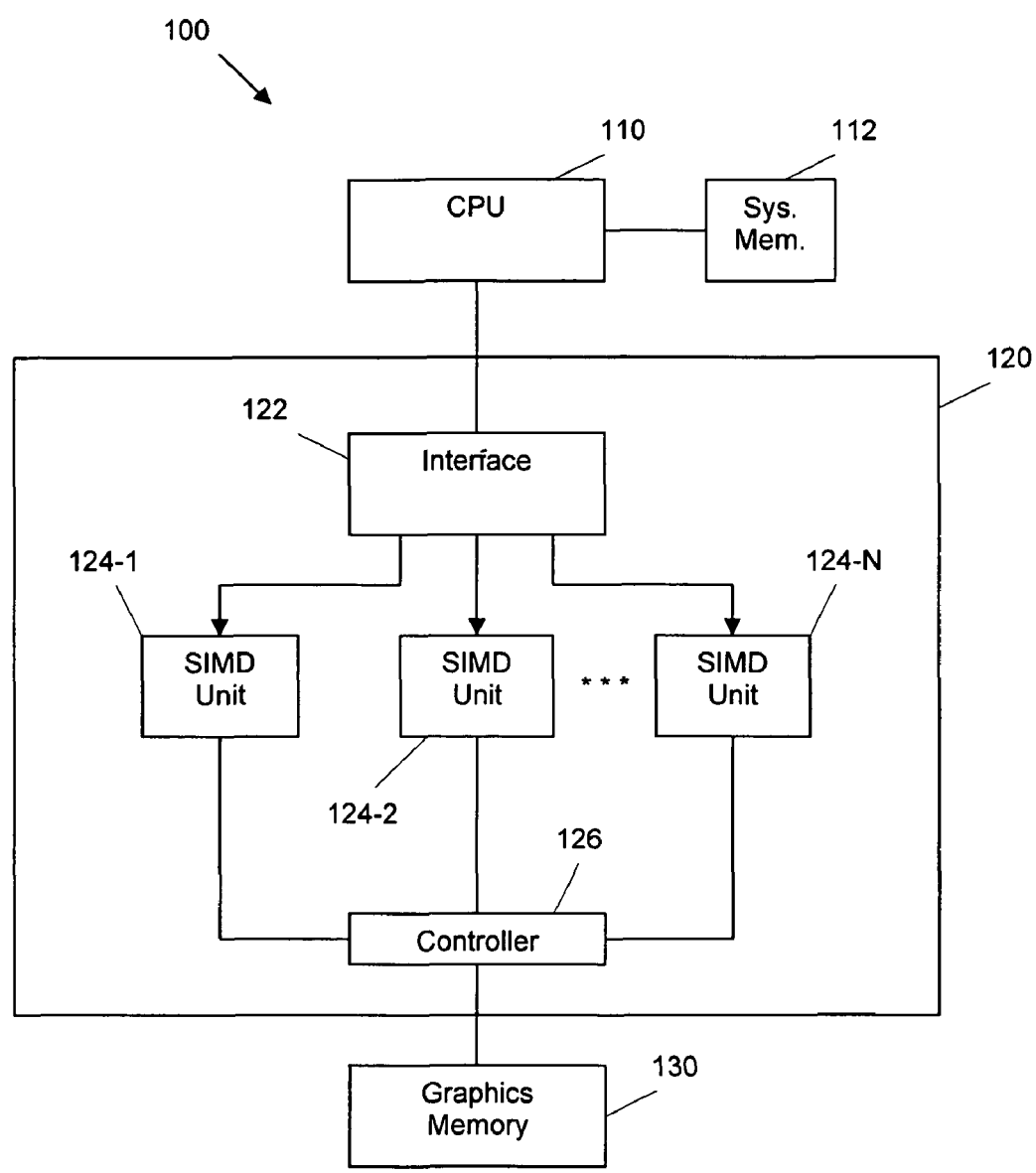
FIG. 1 is a simplified block diagram of a computer system implementing a GPU with a plurality of SIMD processors.

FIG. 1 is a simplified block diagram of a computer system 100 implementing a graphics processing unit (GPU) 120 with an interface unit 122 coupled to a plurality of SIMD processors 124-1, 124-2, ..., 124-N. The SIMD processors 124 have access to a local graphics memory 130 through a memory controller 126. The GPU 120 and the local graphics memory 130 represent a graphics subsystem that is accessed by a central processing unit (CPU) 110 of the computer system 100 using a driver that is stored in a system memory 112.

The present invention is applicable to any processing unit with one or more SIMD processors 124. Therefore, N can be any integer greater than or equal to 1. Also, the processing unit including the SIMD processors 124 may be a CPU, a GPU or any other type of processing unit.

Figure 2:
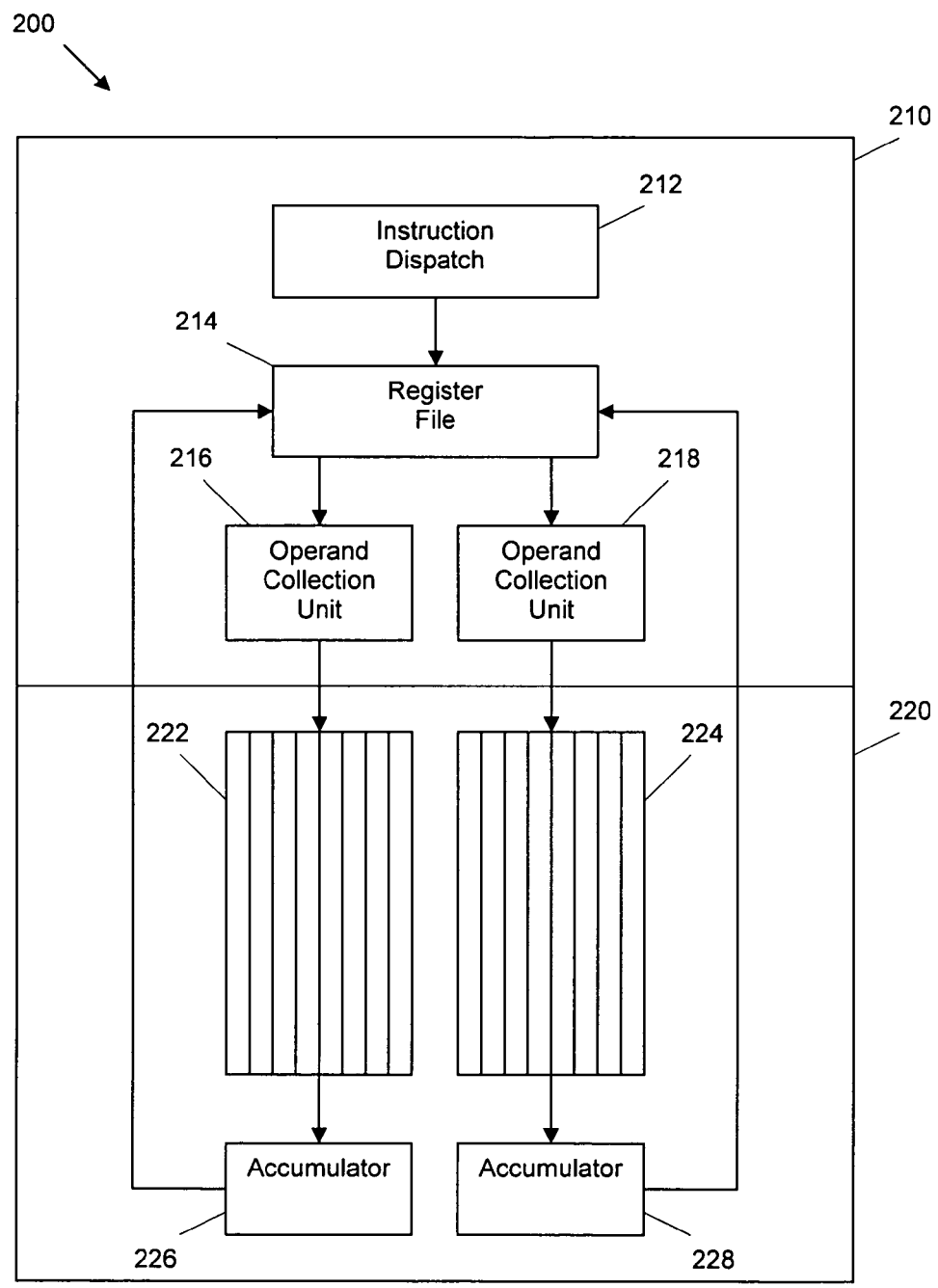
FIG. 2 is a block diagram of a SIMD processor according to an embodiment of the present invention.

FIG. 2 illustrates a SIMD processor according to an embodiment of the invention in greater detail. As shown, the SIMD processor 200, which may be any one of the SIMD processors 124 shown in FIG. 1, includes an instruction processing section 210 and a data processing section 220. The instruction processing section 210 operates at a clock rate that is half the clock rate of the data processing section 220. For convenience, the clock for the instruction processing section 210 will be referred to hereafter as the T clock, and the clock for the data processing section 220 will be referred to hereafter as the H clock.

The instruction processing section 210 includes an instruction dispatch unit 212 for issuing an instruction to be executed by the SIMD processor 200, a register file 214 that stores the operands used in executing the instruction, and a pair of operand collection units 216, 218. The operand collection unit 216 is coupled to a first execution pipeline 222 and collects operands to be supplied to the first execution pipeline 222. The operand collection unit 218 is coupled to a second execution pipeline 224 and collects operands to be supplied to the second execution pipeline 224. In the embodiment of the present invention illustrated herein, the first execution pipeline is configured to execute instructions of a first type, e.g., multiply and add (MAD), and the second execution pipeline is configured to execute instructions of a second type, e.g., special function instructions such as reciprocal, exponential, logarithmic, etc. (SFU). Certain instructions may be carried out in either of the execution pipelines 222, 224. For example, instructions MOV and FMUL may be executed in either of the execution pipelines 222, 224. Each of the execution pipelines 222, 224 has 8 parallel and identically configured data paths.

When the instruction dispatch unit 212 issues an instruction, the instruction dispatch unit 212 sends pipeline configuration signals to one of the two execution pipelines 222, 224. If the instruction is of the MAD type, the pipeline configuration signals are sent to the first execution pipeline 222. If the instruction is of the SFU type, the pipeline configuration signals are sent to the second execution pipeline 222.

Upon issuing an instruction, the instruction dispatch unit 212 also transmits a mask that corresponds to a convoy (which in the embodiment illustrated herein is a group of 32) of threads associated with the issued instruction. If the issued instruction is of the MAD type, the operand collection unit 216 reads the registers within the register file 214 that are associated with the convoy of threads and, for each thread in the convoy, collects a set of operands that are needed to execute the issued instruction. A single set of operands may include one or more operands. Typically a set of operands associated with an instruction of the MAD type includes two or three operands, and a set of operands associated with an instruction of the SFU type includes one operand.

If the issued instruction is of the SFU type, the operand collection unit 218 reads the registers within the register file 124 that are associated with the convoy of threads and, for each thread in the convoy, collects a set of operands that are needed to execute the issued instruction. For each cycle of the T clock, each of the operand collection units 216, 218 is able to collect 16 sets of operands. These sets are supplied to the execution pipelines 222, 224 at a rate of eight sets per H clock cycle. Therefore, the 32 sets of operands associated with a convoy of threads are processed in two T clock cycles or four H clock cycles.

The execution results from the execution pipelines 222, 224 are collected in a pair of accumulators 226, 228. The accumulator 226 collects execution results from the execution pipeline 222 and the accumulator 228 collects execution results from the execution pipeline 224. The execution pipelines 222, 224 and the accumulators 226, 228 are part of the data processing section 220 and operate at a clock rate that is twice the clock rate of the instruction processing section 210. The accumulators 226, 228 write the execution results back to the register file 214 every two H clock cycles, or every one T clock cycle, because the register file 214 operates at the T clock rate. Thus, each of the accumulators 226, 228 collects 16 sets of execution results before it writes back to the register file 214.

The H clock is configured to be a fast clock, because of the types of operations, primarily math operations, being carried out in the execution pipelines 222, 224. The efficient operating speed for math operations, however, is generally different from the efficient operating speed for instruction processing and for the register file 214. The instruction processing and the register file 214 operate more efficiently with a slower clock. Therefore, the SIMD processor 200 is configured with two clock domains, with the instruction processing being carried out at the T clock rate and the data processing being carried out at the H clock rate, which is equal to twice the T clock rate.

Figure 3:
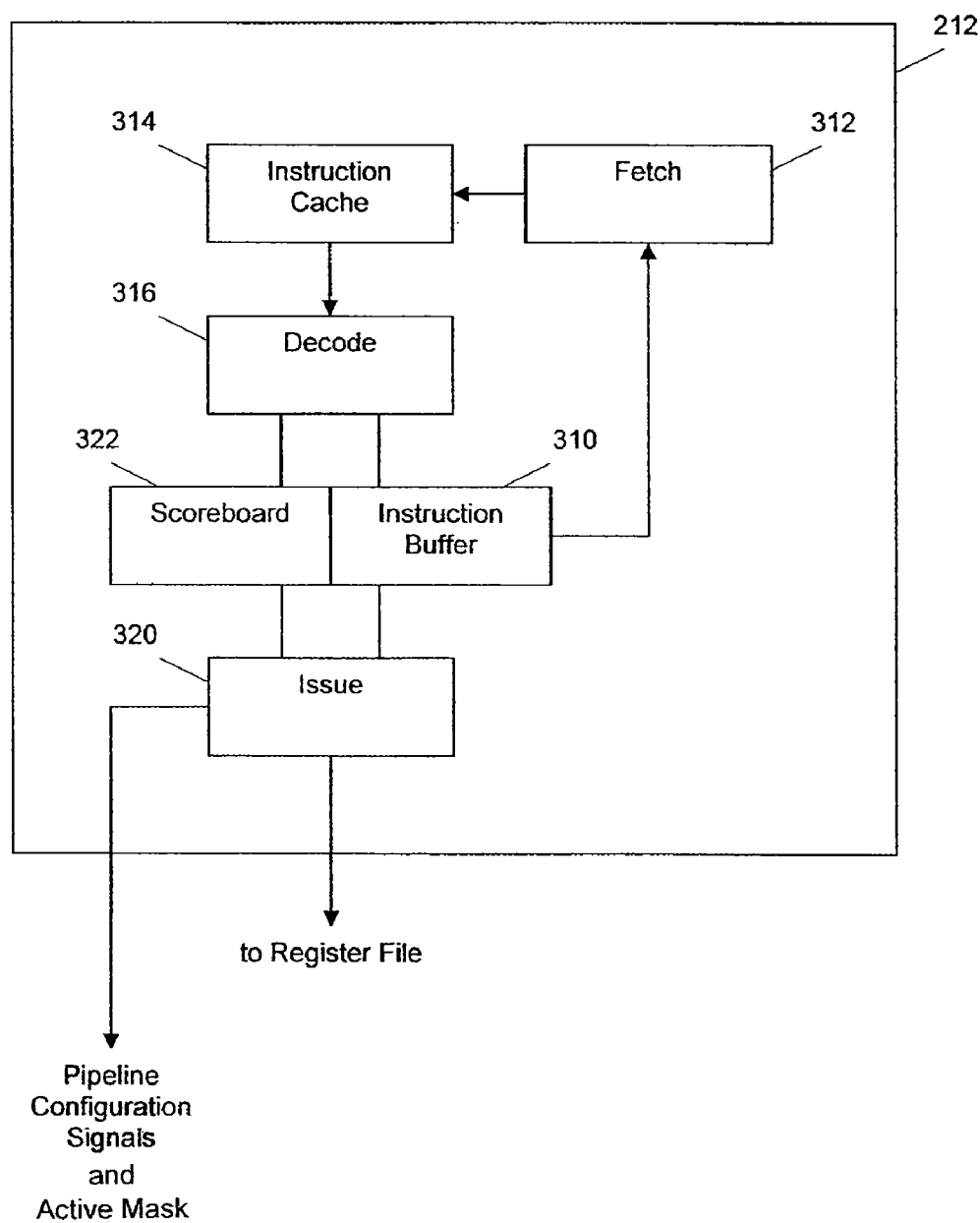
FIG. 3 is a block diagram of an instruction dispatch unit of the SIMD processor shown in FIG. 2.

FIG. 3 is a functional block diagram of the instruction dispatch unit 212 of the instruction processing section 210. The instruction dispatch unit 212 includes an instruction buffer 310 with a plurality of slots (one slot per convoy of threads). The number of slots in this exemplary embodiment is 24 and each slot can hold up to two instructions from a corresponding convoy of threads. If any one of the slots has a space for another instruction, a fetch 312 is made from memory into an instruction cache 314. Before the instruction stored in the instruction cache 314 is added to a scoreboard 322 that tracks the instructions that are in flight, i.e., instructions that have been issued but have not completed, and placed in the empty space of the instruction buffer 310, the instruction undergoes a decode 316. Upon decoding of the instruction, a determination can be made as to whether the instruction is of the MAD type or the SFU type.

The instruction dispatch unit 212 further includes an issue logic 320. The issue logic 320 examines the scoreboard 322 and issues an instruction out of the instruction buffer 310 that is not dependent on any of the instructions in flight. In conjunction with the issuance out of the instruction buffer 310, the issue logic 320 sends pipeline configuration signals to the appropriate execution pipeline and transmits a mask that corresponds to a convoy of threads associated with the issued instruction. The mask indicates which of the threads in the convoy are active, i.e., should be affected by the issued instruction.

Figure 4:
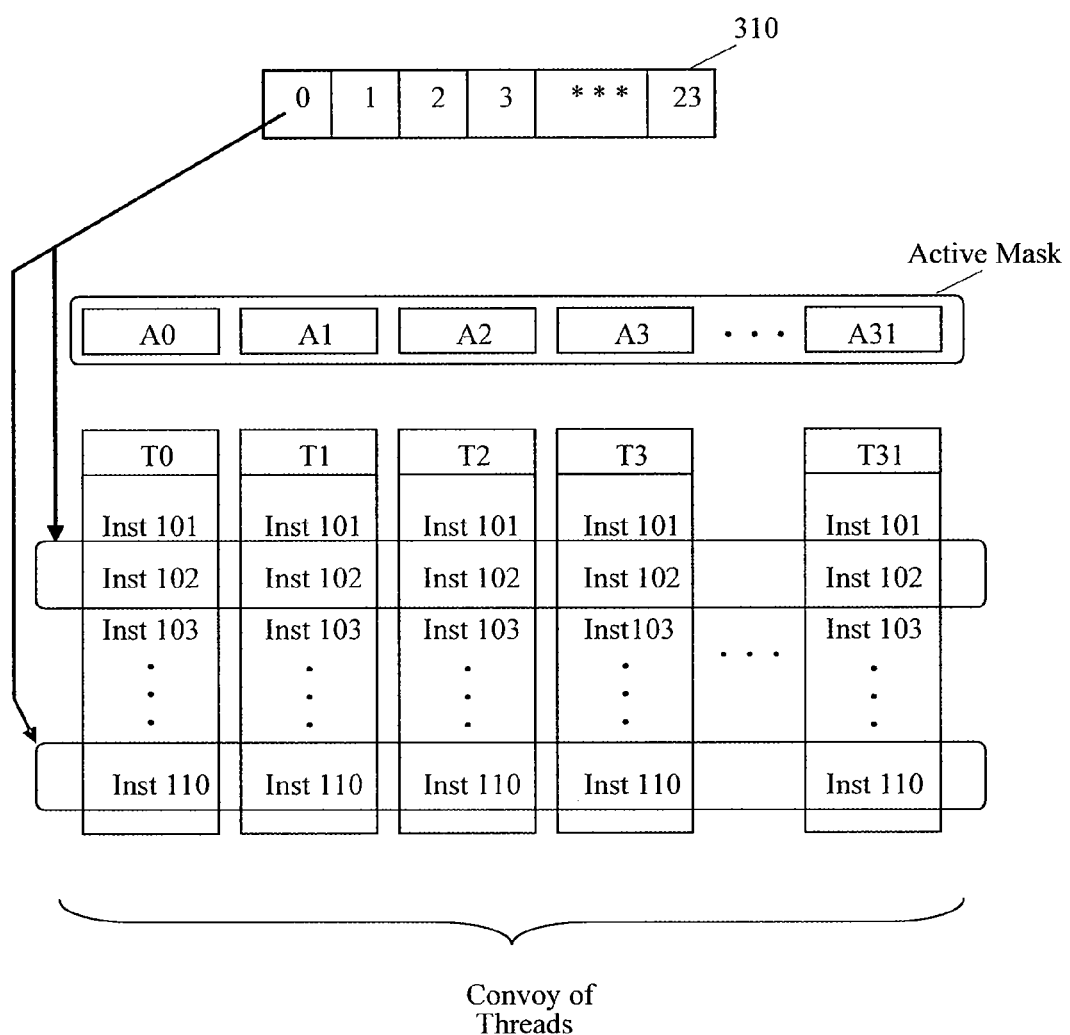
FIG. 4 is a conceptual diagram showing the contents of an instruction buffer.

FIG. 4 illustrates the instruction buffer 310 in further detail. As shown, the instruction buffer 310 has 24 slots. Each slot in the instruction buffer can hold up to two instructions from a convoy (a group of 32) of threads. In the example shown, the two instructions from a convoy of threads, T0 through T31, having program counters of 102 and 110 are stored in slot 0 of the instruction buffer 310. These instructions will be either the MAD type or the SFU type. If an instruction is of the MAD type and is issued out of the instruction buffer 310, the 32 sets of operands associated with the convoy of threads, T0 through T31, will be collected in the operand collection unit 216 and supplied to the execution pipeline 222. On the other hand, if an instruction is of the SFU type and is issued out of the instruction buffer 310, the 32 sets of operands associated with the convoy of threads, T0 through T31, will be collected in the operand collection unit 218 and supplied to the execution pipeline 224.

Figure 5A:
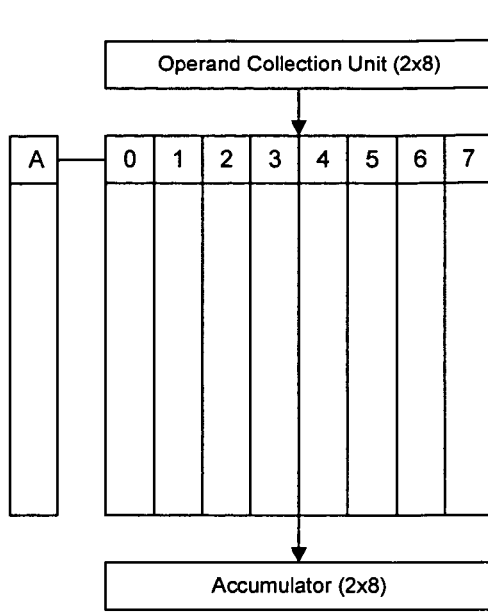
FIGS. 5A-5D illustrate the processing of a group of threads through an SIMD execution pipeline.

FIGS. 5A-5D illustrate selected processing states of the convoy of threads, T0 through T31, through the execution pipeline 222 that is configured to execute a MAD instruction, e.g., Instruction A, issued out of the instruction buffer 310. FIG. 5A shows the state of the execution pipeline 222 after one H clock cycle has elapsed. As shown, after one H clock cycle, 8 sets of operands, identified as 0, 1, 2, 3, 4, 5, 6, 7, that are respectively associated with threads T0, T1, T2, T3, T4, T5, T6, T7, has entered the execution pipeline 222 and is operated on by the first pipe stage of Instruction A. In the very next H clock cycle, a new group of 8 sets of operands will enter the execution pipeline 222 and will be operated on by the first pipe stage of Instruction A, and the initial group of 8 sets of operands will have advanced down one pipe stage and will further be operated on by the second pipe stage of Instruction A. After four H clock cycles, all sets of operands associated with a convoy of threads will have entered the execution pipeline 222. Therefore, each pipe stage of Instruction A will be active for four H clock cycles. At the fifth H clock cycle, it will be configured in accordance with a newly issued instruction of the MAD type.

Figure 5C:
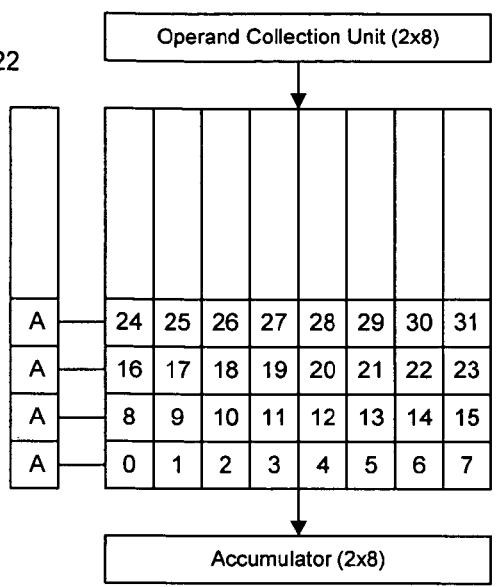
Figure 5B:
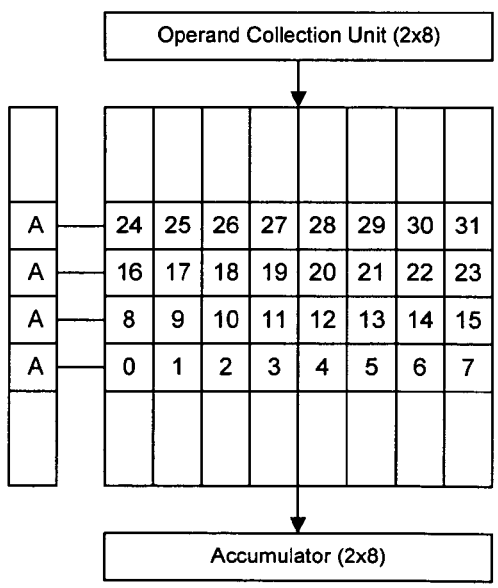
Figure 5D:
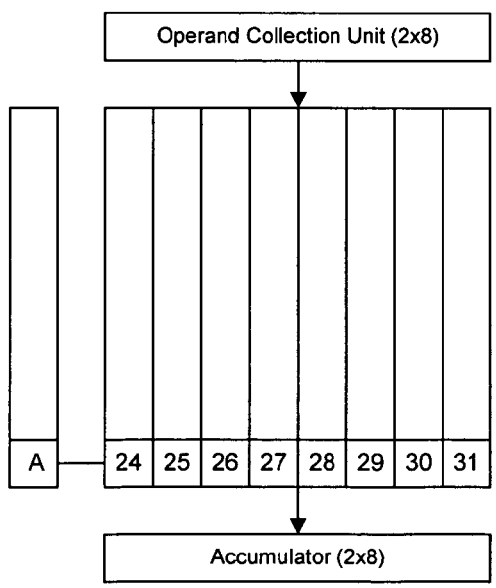

FIG. 5B shows the state of the execution pipeline 222 after all sets of operands associated with a convoy of threads have entered the execution pipeline 222 and been operated on by a few pipe stages of Instruction A. FIG. 5C shows the state of the execution pipeline 222 just before any set of operands exit the execution pipeline 222. FIG. 5D shows the state of the execution pipeline 222 three H clock cycles after the state shown in FIG. 5C. After one more H clock cycle has elapsed, all sets of operands associated with a convoy of threads will have exited the execution pipeline 222.

In the preferred embodiment, the issue logic 320, when issuing instructions out of the instruction buffer 310, alternates between instructions of the MAD type and instructions of the SFU type. In this manner, both of the execution pipelines 222, 224 can be kept completely busy. Successive issuances of MAD type instructions or SFU type instructions may be permitted if the instruction buffer 310 contains only single type of instructions. However, a convoy of 32 threads requires 2 T clocks or 4H clocks to execute, and so, successive issuances of same-type instructions (e.g. MAD-MAD or SFU-SFU) can occur at most every other T clock. Issuing different-type instructions alternately to the two pipelines, on the other hand, permits an instruction to be issued at every T clock and provides for higher performance. The compiler can help with the scheduling of the instructions so as to ensure that different-type instructions are stored in the instruction buffer 310. Allowing different convoys to be slightly apart in the program may also improve performance.

Figure 6:
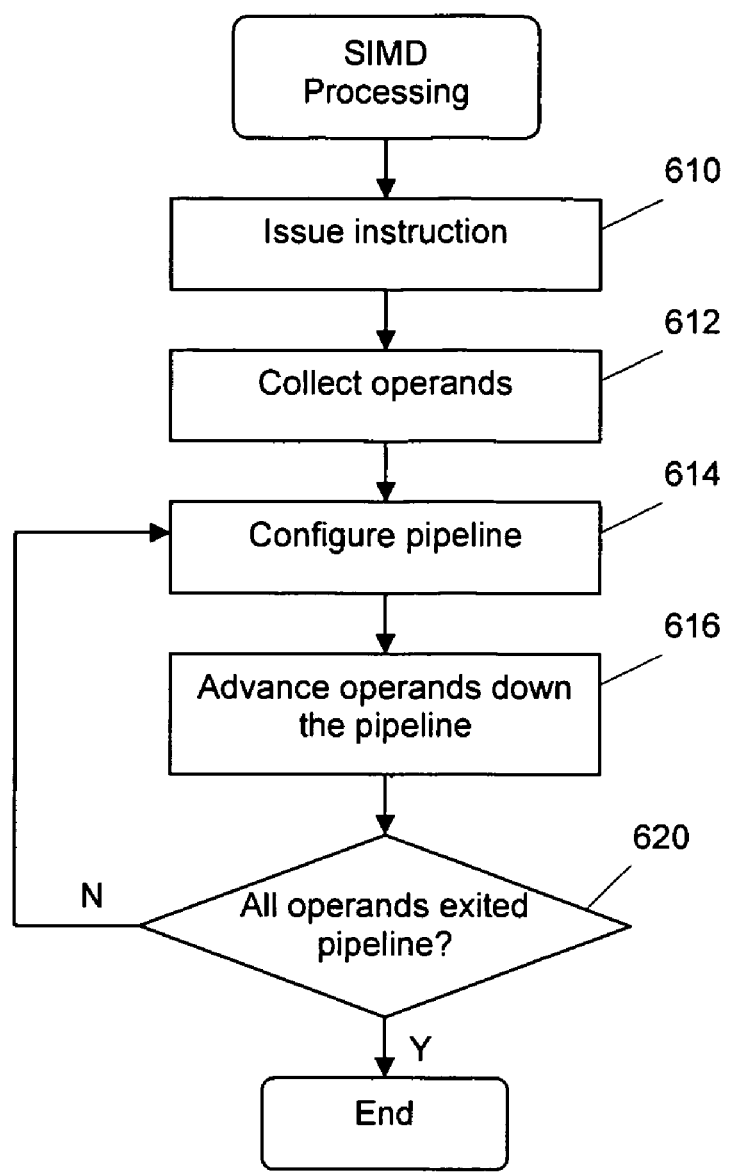
FIG. 6 is a flow diagram that illustrates the process steps carried out by a SIMD processor when executing an instruction for a group of threads.

FIG. 6 is a flow diagram that illustrates the process steps carried out by the SIMD processor 200 when executing one instruction for a convoy of threads in accordance with an embodiment of the present invention. In step 610, an instruction is issued out of the instruction buffer 310. Then, multiple sets of operands are read from the register file 216 and collected in the operand collection unit 216 or 218 corresponding to the type of instruction issued (step 612). In step 614, the execution pipeline 222 or 224 corresponding to the type of instruction issued is configured to execute the issued instruction. In step 616, the collected operands are advanced down the execution pipeline and operated on by multiple pipe stages of the issued instruction. Steps 614 and 616 are carried out continuously until all of the operands collected in step 612 have exited the execution pipeline. While steps 614 and 616 are being carried out, the accumulators 226, 228 collect operands exiting the execution pipelines 222, 224 and write back to the register file 216 every other H clock (i.e., half convoy at a time). When all of the operands collected in step 612 have exited the execution pipeline (step 620), the SIMD processing for the instruction issued in step 610 ends. In the example shown in FIGS. 5A-5D, the initial write-back to the register file 216 occurs two H clocks after the state of the execution pipeline shown in FIG. 5C and the final write-back to the register file 216 occurs four H clocks after the state of the execution pipeline shown in FIG. 5C.

With the embodiments of the present invention described above, the amount of data that is processed through a SIMD processor is increased without increasing the physical data width of the execution pipelines. As a result, the effective instruction processing rate of the SIMD processor is increased.

Furthermore, the present invention provides a flexible way to group threads. In the embodiments of the present invention described above, a convoy is configured as a group of 32 threads, in accordance with the formula: convoy_size=(number of execution pipelines)×(number of data paths in each execution pipeline)×(ratio of the H clock rate to the T clock rate)=2×8×2=32. The flexibility provided by the present invention is that the convoy size could be adjusted. For example, the convoy size could be increased to 64 by issuing an instruction to each execution pipeline at every fourth T clock or at every other T clock when alternating between execution pipelines.

A benefit of having a larger convoy size is that in graphics processing a lot of the instructions that are executed are memory accesses like textures. These instructions are carried out much more efficiently by the memory system if there are a large group of related memory accesses, instead of smaller groups of memory accesses. By clustering or convoying the threads together, the present invention provides for greater memory efficiency. The downside of using convoys that are too large is that things like branches cause some threads in a convoy to execute different instructions than others in the same convoy. In such cases, performance will be lowered since all threads within the same convoy can only execute one instruction at a time.

While the foregoing is directed to embodiments of the present invention, other and further embodiments of the invention may be devised without departing from the basic scope thereof. The scope of the present invention is determined by the claims that follow.

What is claimed is:

1. A processing unit comprising:
a first section for issuing, for each clock cycle at a first clock rate, one instruction and for collecting multiple sets of operands associated with the one instruction, wherein an active mask indicates a portion of processing threads in a group of threads that execute the one instruction in parallel, the portion of processing threads including a first processing thread that is included in the group of threads and does execute the one instruction but not including a second processing thread that is included in the group of threads and does not execute the one instruction; and
a second section including first and second execution pipelines, each including two or more parallel data paths, wherein each one of the two or more parallel data paths corresponds to a different bit in the active mask, and wherein the operands and the active mask are supplied to one of the two execution pipelines,
wherein the second section operates at a second clock rate that is different from the first clock rate, the first section includes an instruction buffer comprising a plurality of instructions of at least two types, the first execution pipeline is configured to execute instructions of a first type, and the second execution pipeline is configured to execute instructions of a second type, the first section is configured to select one of the instructions in the instruction buffer as the one instruction for each clock cycle at the first clock rate, and wherein an instruction of a different type is selected on alternating clock cycles.

2. The processing unit according to claim 1, wherein the second clock rate is at least twice the first clock rate.

3. The processing unit according to claim 1, wherein the second section includes execution pipelines of at least two types, and the first execution pipeline is of a first type and the second execution pipeline is of a second type.

4. The processing unit according to claim 3, wherein the first section is configured to issue multiple instructions of at least two types over time and, for each issued instruction, to collect multiple sets of operands, and wherein operands in the multiple sets associated with an instruction of a first type are supplied to the first execution pipeline and operands in multiple sets associated with an instruction of a second type are supplied to the second execution pipeline.

5. The processing unit according to claim 1, wherein the number of sets of operands collected for said instruction equals the total number of parallel data paths in the first and second execution pipelines multiplied by the ratio of the second clock rate to the first clock rate.

6. The processing unit according to claim 5, wherein the one instruction is an instruction in a sequence of instructions that are to be executed in parallel for the group of threads, and each of the multiple sets of operands corresponds to one of the threads in the group.

7. The processing unit of claim 1, wherein the instruction buffer is configured to store a plurality of instructions for multiple thread groups, the instruction buffer including only one instruction slot for each thread group.

8. The processing unit according to claim 1, wherein the first execution pipeline is configured to execute instructions of the first type including a multiply and add (MAD) instruction and not execute instructions of the second type and the second execution pipeline is configured to execute instructions of the second type including a reciprocal instruction, an exponential instruction, and a logarithmic instruction and not execute instructions of the first type.

9. A method of processing computer program instructions through a plurality of execution pipelines, comprising the steps of:
classifying the instructions to be one of at least two types, wherein a first execution pipeline is configured to execute instructions of the first type, and a second execution pipeline is configured to execute instructions of the second type;
issuing, for each clock cycle at a first clock rate, one instruction for a group of multiple threads;
transmitting an active mask indicating a subset of processing threads in the group of threads that do execute the one instruction in parallel and at least a first processing thread that is also included in the group of threads but does not execute the one instruction;
collecting multiple sets of operands associated with the one instruction at the first clock rate; and
supplying the collected operands and the active mask to one of the two execution pipelines at a second clock rate, wherein the number of multiple threads in the group is equal to the total number of data paths provided in the plurality of execution pipelines multiplied by the ratio of the second clock rate to the first clock rate, the step of issuing occurs for each clock cycle at the first rate and an instruction of a different type is selected on alternating clock cycles from an instruction buffer comprising a plurality of instructions and wherein each one of the data paths corresponds to a different bit in the active mask.

10. The method according to claim 9, wherein a stream of instructions are issued sequentially at the first clock rate, and for each of said instructions, multiple sets of operands are collected at the first clock rate.

11. The method according to claim 9, wherein an instruction of a third type is supplied to one of the first execution pipeline and the second execution pipeline.

12. The method according to claim 9, wherein the second clock rate is at least twice the first clock rate.

13. The method according to claim 9, wherein the one instruction is an instruction in a sequence of instructions that are to be executed in parallel for said group of threads, and each of the multiple sets of operands corresponds to one of the threads in the group.

14. The method according to claim 9, wherein the first execution pipeline is configured to execute instructions of the first type including a multiply and add (MAD) instruction and not execute instructions of the second type and the second execution pipeline is configured to execute instructions of the second type including a reciprocal instruction, an exponential instruction, and a logarithmic instruction and not execute instructions of the first type.

15. A computer system comprising:
a processing unit configured to execute a stream of instructions in a plurality of execution pipelines, wherein the stream of instructions are executed in parallel by a subset of threads in a thread group according to an active mask and at least a first processing thread that is also included in the group of threads but does not execute the instruction in the stream of instructions, wherein each one of the threads in the thread group corresponds to a different bit in the active mask; and
a memory unit storing instructions to be executed by the processing unit and operands associated with the instructions,
wherein the processing unit is configured to issue one instruction in the stream of instructions each clock cycle at a first clock rate and the speed of execution through the execution pipelines is at a second clock rate that is faster than the first clock rate, and
wherein the instructions are of at least two types, the instructions of a first type executable in a first execution pipeline and the instructions of a second type executable in a second execution pipeline, and
wherein the processing unit issues the stream of instructions sequentially and, for each issued instruction, collects multiple sets of operands associated with said each issued instruction, and
wherein the number of sets of operands collected for each issued instruction is greater than or equal to the total number of data paths in the first and second execution pipelines; and
an instruction buffer comprising a plurality of instructions from which the one an instruction to be issued for each clock cycle at the first clock rate is selected, wherein an instruction of a different type is selected on alternating clock cycles.

16. The computer system according to claim 15, and wherein the number of sets of operands collected for each of the issued instructions is equal to the total number of data paths in the first and second execution pipelines multiplied by the ratio of the second clock rate to the first clock rate.

17. The computer system according to claim 15, wherein each of the issued instructions comprises an instruction in a sequence of instructions that are to be executed according to the active mask for the subset of threads in the thread group, and the number of sets of operands collected for said each issued instruction is equal to the number of threads in the thread group.

18. The computer system according to claim 15, further comprising a register file from which the operands in the sets are read.

19. The computer system according to claim 15, wherein the first execution pipeline is configured to execute instructions of the first type including a multiply and add (MAD) instruction and not execute instructions of the second type and the second execution pipeline is configured to execute instructions of the second type including a reciprocal instruction, an exponential instruction, and a logarithmic instruction and not execute instructions of the first type.

* * * * *